United States Patent [19]

George

[11] Patent Number: 5,414,329

[45] Date of Patent: May 9, 1995

[54] VOLTAGE VARIATION COMPENSATION ARRANGEMENT FOR SAMPLE AND HOLD CAPACITOR

[75] Inventor: John B. George, Carmel, Ind.

[73] Assignee: Thomson Consumer Electronics, Inc., Indianapolis, Ind.

[21] Appl. No.: 219,222

[22] Filed: Mar. 28, 1994

[51] Int. Cl.⁶ ............................................. H01J 29/51
[52] U.S. Cl. ................................ 315/368.23; 348/746
[58] Field of Search .......................... 315/408, 368.23; 348/746

[56] References Cited

U.S. PATENT DOCUMENTS

| | | | |
|---|---|---|---|
| 4,500,816 | 2/1985 | Murphy | 315/368 |
| 4,634,937 | 1/1987 | Haferl | 315/371 |
| 4,709,193 | 11/1987 | Dietz | 315/408 |

OTHER PUBLICATIONS

Appln. Ser. No. 08/115,602, filed Sep. 3, 1993 in the name of J. B. George, entitled Automatic Calibration in a Waveform Generator for Deflection.

Analog-Digital Coversion Handbook, pp. III-73—III--86.

*Primary Examiner*—Theodore M. Blum
*Attorney, Agent, or Firm*—Joseph S. Tripoli; Joseph J. Laks; Sammy S. Henig

[57] ABSTRACT

An analog multiplier generates an output signal that is coupled to a convergence winding of a projection television. The analog multiplier multiplies a horizontal rate sawtooth signal with a vertical rate parabola signal. The multiplier DC operating point is adjusted, by developing a DC voltage in a hold capacitor of a sample and hold arrangement during each vertical blanking interval. To prevent a change in the capacitor voltage during vertical trace, a vertical rate sawtooth signal is coupled to the hold capacitor via a second capacitor.

9 Claims, 1 Drawing Sheet

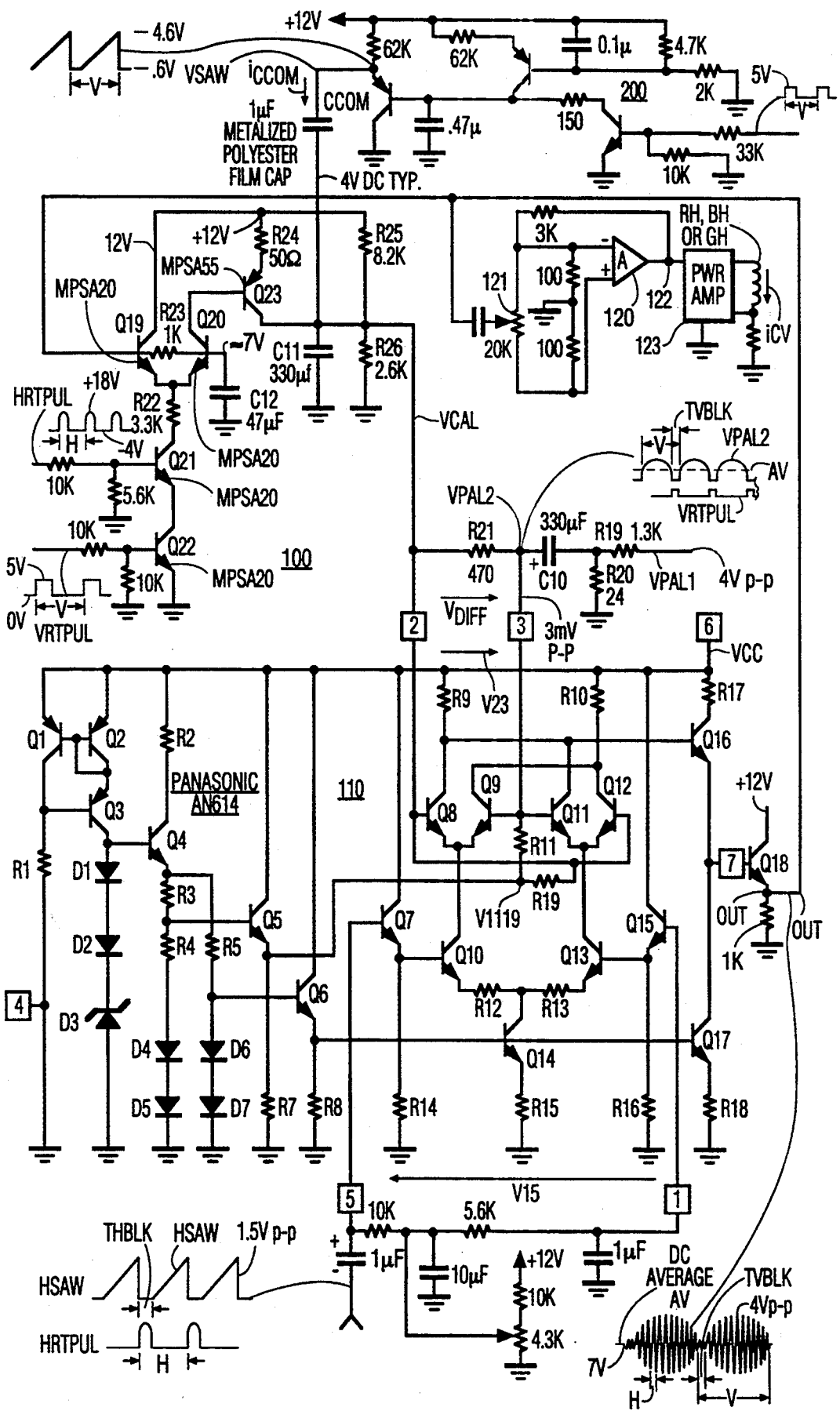

VOLTAGE VARIATION COMPENSATION ARRANGEMENT FOR SAMPLE AND HOLD CAPACITOR

The invention relates to a sample and hold arrangement of a video display that operates at a frequency related to a deflection frequency.

To correct for E-W pincushion distortion with respect to an electron beam that produces a green raster in a cathode ray tube (CRT) of, for example, a projection television receiver, and to correct for the misconvergence with respect to the electron beams that produce the blue and red rasters, a convergence winding is employed. The convergence winding is driven by a sawtooth current component at a horizontal rate with an amplitude that varies in a vertical rate parabolic manner. The waveform of the sawtooth current component is produced in a four-quadrant analog multiplier. The multiplier receives a vertical rate parabola signal at a first input and a horizontal rate sawtooth signal at a second input.

During vertical blanking, the vertical rate parabola signal is at a level that is intended to produce by the multiplication operation, minimum peak-to-peak amplitude of the sawtooth output signal of the multiplier.

Disadvantageously, because of, for example, tolerances, drifts and components aging, the multiplier could operate in an imbalanced condition that is equivalent to having a DC voltage shift or offset at the first input. Consequently, the peak-to-peak amplitude of the output signal may not be minimal, during vertical blanking. Such imbalanced operation may be undesirable.

U.S. patent application No. 115,602 filed Sep. 3, 1993, entitled AUTOMATIC CALIBRATION IN A WAVEFORM GENERATOR FOR DEFLECTION, in the name of J. B. George discloses a video display deflection apparatus that includes a source of a modulation signal at a vertical deflection frequency and a source of a second signal at a horizontal deflection frequency. A modulator responsive to the modulation and second signals generates an output signal by multiplication operation. An amplifier is responsive to the output signal and coupled to a winding for generating a magnetic field that corrects for a beam landing error in a cathode ray tube. An adjusting signal that is coupled to an input of the modulator is generated in a sample and hold capacitor during each vertical blanking interval. The adjusting signal reduces an amplitude of the output signal in a negative feedback manner, during the vertical blanking interval.

It may be preferable to utilize a smaller capacitor, rather than a larger one, because of the cost and space and response time associated with the capacitor. Disadvantageously, the smaller is the capacitance, the greater is the tendency of the voltage in the capacitor to change between vertical blanking intervals, when the capacitor is required to maintain a constant voltage. The change in the capacitor voltage may occur due to, for example, a discharge via a resistance that is coupled across the capacitor. It may be desirable to compensate for the change in the capacitor voltage without utilizing a large sample and hold capacitor.

A sample and hold arrangement, embodying an aspect of the invention, of a video apparatus includes a source of a synchronizing signal at a frequency that is related to a deflection frequency. A switching arrangement responsive to the synchronizing signal and to an input signal and coupled to the capacitance develops a voltage in the capacitance. The capacitance voltage is indicative of a magnitude of the input signal during a given sampling interval. The input signal is decoupled from the capacitance during a hold interval. The capacitance is coupled in a current path that bypasses the switching means arrangement, thereby tending to change a charge stored in the capacitance during the hold interval. A source of a compensating signal at a frequency that is related to a deflection frequency is provided. A current is generated in the capacitance in accordance with the compensating signal that compensates for the tendency of the capacitance charge to change during the hold interval.

The sole FIGURE illustrates partially in a block diagram manner a convergence/E-W correction circuit that includes a compensation arrangement, embodying an aspect of the invention, of a projection television receiver.

The FIGURE illustrates a convergence/E-W correction circuit 100, embodying an aspect of the invention, in a projection television receiver. A horizontal rate sawtooth signal HSAW, produced in a conventional manner, not shown, is AC coupled to an input of an analog multiplier 110, between pins 1 and 5, to form a sawtooth signal V15 that includes both AC and DC components.

A vertical rate parabola signal VPAL1 that is produced in a conventional manner, not shown, is coupled via a voltage divider, formed by a resistor R19 and a resistor R20, and then AC coupled via an electrolytic capacitor C10 to pin 3 of multiplier 110 to form an AC parabola signal component VPAL2. Signal component VPAL2 is developed both at a base of a transistor Q9 and at a base of a transistor Q11 of multiplier 110. A hold capacitor C11 that is coupled to pin 3 of multiplier 110 maintains pin 2 at a constant or at A/C ground potential with respect to parabola signal component VPAL2. Thus, AC signal component VPAL2 is developed across a resistor R21 of a combined AC/DC signal V23, between pins 3 and 2 of multiplier 110.

A DC signal component $V_{DIFF}$ is developed across resistor R21, between pins 2 and 3 of multiplier 110. DC signal component $V_{DIFF}$ is determined by a constant voltage V1119, between a resistor R11 and a resistor R14, by a ratio between resistors R21 and R11 and by a level of a calibration signal VCAL. Combined AC/DC signal V23 across resistor R21 is equal to the sum of AC signal component VPAL2 and DC signal component $V_{DIFF}$.

Multiplier 110 produces a sawtooth output signal OUT that varies in accordance with the result of the multiplication of the instantaneous values of signals V23 and V15. Signal OUT having a DC voltage component is AC-coupled in a conventional manner to a pre-amplifier 120 via a potentiometer 121. Other waveforms that are also coupled to pre-amplifier 120, in a conventional manner, for effectuating convergence are not shown for simplifying the diagram. Potentiometer 121 is adjusted for controlling the amplitude as well as the phase, 0° or 180°, of an output signal 122 of amplifier 120 with respect to signal OUT. Signal 122 is coupled via a power amplifier 123 to a corresponding convergence coil, for example, convergence coil RH, RB or RG, for producing a corresponding convergence current iCV in the coil. Current iCV provides E/W pincushion correction. When applied to the green beam it corrects geometry; alternatively, when applied to the blue beam or red beam, it provides convergence.

A variation of signal VCAL produces a corresponding variation of DC component signal $V_{DIFF}$ that determines during which portion of parabola signal VPAL2, a peak-to-peak amplitude of signal OUT is at a minimum. When calibrated, multiplier 110 produces the peak-to-peak amplitude of signal OUT at the minimum and at a predetermined phase in accordance with signal VPAL2, during a vertical blanking interval TVBLK.

Signal VCAL is produced automatically in a feedback control loop mode of operation. To produce signal VCAL, signal OUT is coupled to a base of a transistor Q19 that forms a differential amplifier with a transistor Q20. A base voltage of transistor Q20 is developed by passing signal OUT via a low pass filter formed by a resistor R23 and a capacitor C12. As a result, a base voltage of transistor Q20 does not contain AC component signal and has a DC magnitude that is equal to the average value of the base voltage of transistor Q19.

A pair of transistor switches Q21 and Q22 are coupled in series for producing an emitter current via a resistor R22 in one or both transistors Q19 and Q20 when both transistor switches Q21 and Q22 conduct. Transistor switch Q22 is turned on by a vertical blanking signal VRTPUL, only during vertical blanking interval TVBLK. Transistor switch Q21 is turned on by a horizontal retrace pulse HRTPUL, only during an interval THBLK, at corresponding peak portion of signal HSAW. Such peak portion of signal HSAW occurs between a retrace ramp portion HSAW1 and a trace ramp portion HSAW2. Transistor switch Q1 is turned on, during the peak of signal HSAW that is approximately flat or constant.

A collector of transistor Q20 is coupled to a base of a transistor Q23 for turning on transistor Q23 when transistor Q20 is conductive; otherwise, transistor Q23 is nonconductive. An emitter resistor R24 is coupled to an emitter of transistor Q23. The emitter/collector current of transistor Q23 is determined by resistor R24 when transistor Q23 is turned on by transistor Q20. The collector of transistor Q23 is coupled to capacitor C11 to charge capacitor C11, when transistors Q20 and Q23 are conductive. A voltage divider formed by a resistor R25 and a resistor R26 develops a predetermined DC voltage in capacitor C11. For steady state operation, transistor Q23 produces a collector current that increases the voltage level of signal VCAL above what is produced by resistors R25 and R26. When both transistor switches Q21 and Q22 are turned on, the collector current in transistor Q20 is determined by a difference between a level of a flat portion, not shown, of sawtooth signal OUT, that is produced during interval THBLK, and the average value of signal OUT that is developed at the base voltage of transistor Q19, as explained before. The voltage difference between the base voltages of transistors Q19 and Q20 is proportional to the peak-to-peak amplitude of signal OUT, during vertical blanking interval TVBLK. The voltage difference between the base voltages of transistors Q19 and Q20 is sampled by the operation of sampling or switching transistors Q21 and Q22 for controlling the conduction of transistor Q23.

Should the peak-to-peak amplitude of signal OUT tend to increase, during interval TVBLK, transistor Q23 would turn on harder and for a longer period of time in a manner to increase DC signal VCAL. In this way, the peak-to-peak amplitude of signal OUT is automatically reduced, during interval TVBLK. On the other hand, should signal VOUT be in the opposite polarity than required, during horizontal blanking interval THBLK, transistor Q23 will not turn on and signal VCAL will decrease until signal VCAL becomes sufficiently small to cause polarity reversal. Thus, in steady state operation, during interval TVBLK, the phase of signal OUT is a predetermined phase and its amplitude is at a minimum as controlled by the feedback loop gain.

During vertical trace, capacitor C11 tends to discharge gradually through a current path that includes resistors R11 and R19, R15 and R26 causing a droop in signal VCAL. It may be desirable to compensate for the decrease in the level of signal VCAL that results from the discharge of capacitor C11. The decrease in signal VCAL for a given vertical trace interval may change with a change in the value of the capacitance, because of, for example, aging. It may be desirable to compensate for the discharge or droop of capacitor C11 in a manner that takes into account the change in the capacitance.

In accordance with an aspect of the invention, a compensating capacitor CCOM is coupled to a conventional source 200 of a compensating, sawtooth signal VSAW at a vertical rate. Signal VSAW may be already available in a television receiver for other purposes such as convergence. During vertical trace, a current $i_{ccom}$ in compensating capacitor CCOM supplies the current that would have, otherwise, discharged capacitor CCOM. As a result, the discharge of capacitor CCOM is reduced. Capacitor CCOM is of a metalized polyester film gap type so that it does not change appreciably with aging and temperature variations. Thus, the compensation current does not vary. Therefore, advantageously, the compensation provided for maintaining signal VCAL constant, during vertical trace, is less dependent on aging and temperature variation.

What is claimed is:

1. A sample and hold arrangement of a video apparatus, comprising:
   a source of a synchronizing signal at a frequency that is related to a deflection frequency;
   a sampling and hold capacitance;
   a source of an input signal;
   switching means responsive to said synchronizing signal and to said input signal and coupled to said capacitance for developing a voltage in said capacitance that is indicative of a magnitude of said input signal during a given sampling interval, and for decoupling said input signal from said capacitance during a hold interval, said capacitance being coupled in a current path that bypasses said switching means;
   a source of a compensating signal at a frequency that is related to a deflection frequency; and
   means coupled to said capacitance and to said source of said compensating signal for generating a current in said capacitance that prevents a current flowing in said capacitance via said current path from changing a charge stored in said capacitance, during said hold interval.

2. An apparatus according to claim 1 further comprising, a deflection circuit responsive to said capacitance voltage for correcting a beam landing error in a cathode ray tube.

3. An apparatus according to claim 1, further comprising, a source of a modulation signal at a frequency that is related to a vertical deflection frequency, a source of a second signal at a frequency that is related to a horizontal deflection frequency, a modulator responsive to said modulation and second signals for generating an output signal at a frequency that is related to said horizontal deflection frequency, modulated in accordance with said modulation signal and an amplifier responsive to said output signal and coupled to a winding for generating a magnetic field that corrects for a beam landing error in a cathode ray tube, wherein said switching means is responsive to said modulator output signal for developing said capacitor voltage that is coupled to an input of said modulator for reducing an amplitude of said output signal in a negative feedback manner, during a predetermined portion of a period of said modulation signal, remote from a peak amplitude of said output signal.

4. An apparatus according to claim 3, wherein said capacitance voltage maintains said amplitude of said output signal at a minimum during a vertical blanking interval.

5. An apparatus according to claim 1, wherein said compensating signal varies in a sawtooth manner.

6. An apparatus according to claim 1, wherein said compensating current generating means comprises a second capacitor.

7. An apparatus according to claim 6, wherein said second capacitor is made of a different material from said capacitance in a manner to make the compensation substantially less affected by aging and temperature variation of said capacitance.

8. An apparatus according to claim 6, wherein said capacitance and said second capacitor are coupled in series.

9. A sample and hold arrangement of a video apparatus, comprising:
   a source of a synchronizing signal at a frequency that is related to a deflection frequency;
   a sampling and hold capacitance;
   a source of an input signal;
   a switching arrangement responsive to said synchronizing signal and to said input signal and coupled to said capacitance for developing a voltage in said capacitance that is indicative of a magnitude of said input signal during a given sampling interval, and for decoupling said input signal from said capacitance during a hold interval, said capacitance being coupled in a current path that bypasses said switching arrangement;
   a source of a compensating current at a frequency that is related to a deflection frequency coupled to said capacitance for preventing a current flowing in said capacitance via said current path from changing a charge stored in said capacitance during said hold interval.

* * * * *